United States Patent Office 3,560,415
Patented Feb. 2, 1971

3,560,415
CELLULAR POLYURETHANE PLASTICS
Gerhard Grögler and Erwin Windemuth, Leverkusen, Germany, assignors to Farbenfabriken Bayer Aktiengesellschaft, Leverkusen, Germany, a corporation of Germany
No Drawing. Filed Feb. 27, 1968, Ser. No. 708,502
Claims priority, application Germany, Feb. 28, 1967,
F 51,654
Int. Cl. C08g 22/04, 22/16, 22/44
U.S. Cl. 260—2.5
8 Claims

ABSTRACT OF THE DISCLOSURE

Foam plastics based on compounds with reactive hydrogen atoms, organic polyisocyanates, and water as blowing agent by the single stage or multistage process, in which foaming with polyisocyanates and water takes place in the presence of compounds with at least one aziridine ring, the nitrogen atom of which is linked to a methylene group which may be alkylated or arylated, which aziridine compounds may already have a high molecular weight and which, at least in the cases where only one aziridine ring is present in the molecule, still have at least one hydrogen atom which is reactive with isocyanates.

---

This invention relates to cellular polyurethane plastics and more particularly to cellular polyurethane plastics which are prepared by an improved process.

Processes for the production of foam plastics based on compounds with reactive hydrogen atoms, polyisocyanates, and water as blowing agent are already known. By adding reaction accelerators, emulsifiers, stabilizers, pore regulators and other additives, the foam forming reactions may be so adjusted with respect to each other that large scale machine operated production of foam plastics with different properties becomes possible (see e.g. Kunststoff-Handbuch, vol. VII, "Polyurethane," Carl Hanser publisher, Munich, pages 25–28 and 96–120.)

It is therefore an object of this invention to provide improved cellular polyurethane plastics and an improved process for the preparation thereof without the necessity of numerous additives and while still having satisfactory foaming and good quality foamed plastics. Another object of this invention is to provide a process and improved cellular polyurethane plastic which employs heretofore known additives in smaller quantities than possible with prior art processes. Still another object of this invention is to provide an improved additive for the production of cellular polyurethane plastics. A further object of this invention is to provide cellular polyurethane plastics which have improved fastness to light. Another object of this invention is to provide cellular polyurethane plastics which have improved resistance to burning. Still another object of this invention is to provide an improved process for the preparation of polyurethane plastics based on prepolymers.

The foregoing objects and others which will become apparent from the following description are accomplished in accordance with the invention, generally speaking, by providing cellular polyurethane plastics and an improved process for the preparation thereof wherein an organic compound containing reactive hydrogen atoms as determined by the Zerewitinoff method and water are reacted with an organic polyisocyanate in order to prepare a cellular polyurethane plastic, the reaction between at least the organic polyisocyanate and the water being carried out in the presence of a compound which has at least one aziridine ring in which the nitrogen atom is bonded to a methylene group and at least in the case where only one aziridine ring is present in the molecule the compound still has at least one hydrogen atom that is reactive with isocyanates.

The invention thus relates to the process for the production of foam plastics based on compounds with reactive hydrogen atoms, organic polyisocyanates, and water as blowing agent by the single stage or multistage process, in which foaming with polyisocyanates and water takes place in the presence of compounds with at least one aziridine ring, the nitrogen atom of which is linked to a methylene group which may be alkylated or arylated, which aziridine compounds may already have a high molecular weight and which, at least in the cases where only one aziridine ring is present in the molecule, still have at least one hydrogen atom which is reactive with isocyanates.

The process according to the invention provides numerous advantages over the processes previously known. Whereas in the conventional processes, as already mentioned above, numerous additives are required to achieve satisfactory foaming and produce good quality foam plastics, these additives are required in much smaller quantities in the process according to the invention and in some cases they can be omitted completely without damage to the foaming process or properties of the resultant foam plastic.

The aziridine compounds used are strong bases. The systems capable of foaming are thus distinguished by increased activities, i.e. shorter setting times in conjunction with rapid surface drying of the foams. This leads to economical production of the foam plastics using mechanical apparatus.

Another advantage of the increased activity of the foamable mixtures is that it becomes possible to readily produce foam plastics using exclusively aliphatic polyisocyanates that are known to be less reactive such as 1,6-diisocyanatehexane. Compared with the foam plastics produced from aromatic polyisocyanates, these foam plastics are distinguished by a very high fastness to light.

As is well known, foam plastics based on polyurethane are combustible (see Kunststoff-Handbach, vol. VIII, "Polyurethane," p. 475). This undesirable property has been hitherto countered by using additives such as chlorinated or brominated phosphoric acid esters in quantities of 5–15 parts by weight, based on 100 parts by weight of the polyol put into the reaction, which additives render the foam difficultly inflammable or cause it to be self-extinguishing in the absence of a flame.

These additives, however, impair the properties of the foam plastics and in addition, the desired effect is reduced after prolonged storage. The foam plastics according to the invention are unexpectedly found to be difficultly inflammable, and with certain combinations of the components one even obtains foam plastics which are noncombustible according to the combustibility test described in ASTM–D 1692.

Aziridine compounds suitable for the invention include for example those of the general Formula I

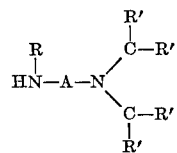

I in which R is hydrogen, an alkyl, cycloalkyl or aryl radical; R' is hydrogen, an alkyl, hydroxyalkyl or aryl radical in which two groups R' may also be joined together to form a ring; and A is

or a bifunctional organic radical which is linked to the aziridine nitrogen atom via

in which R has the same meaning as above.

The following are examples of compounds of this class:

1-(2-aminoethyl)-aziridine,
1-(2-methylamino-ethyl)-aziridine,
1-(2-amino-2-methyl-ethyl)-2-methyl-azirdine,
1 - (2 - methylamino - 2 - methyl - ethyl) - 2 - methyl-aziridine,
1-(2-aminoisobutyl)-2, 2-dimethyl-aziridine,
1-(5-amino-pentyl)-aziridine,
1-(7-amino-heptyl)-aziridine,
1-(2(amino-propyl)-aziridine,
1-(ethylaminomethyl)-2-propyl-aziridine,
1-(2-hexylaminoethyl)-2-hydroxyethyl-aziridine,
1-(2-dodecylamino-butyl)-2-phenyl-aziridine,
1-(cyclohexylamino-methyl)-2-hydroxymethyl-aziridine,
1-(phenylamino-ethyl)-aziridine, and compounds in general obtained by addition of acrylonitrile to aziridines of the general Formula II

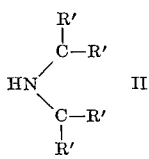

in which R' has the meaning already indicated and two radicals R', may also be joined together to form a ring, as in the case of 1,2-iminocyclohexane or of spirocyclohexylethyleneimine, with subsequent hydrogenation of the cyano groups. An example of such compound is 1-(3-amino-propyl)-2,3-dimethyl-aziridine.

Linear or branched aziridines of the general Formula I which can be obtained by polymerization of aziridines of the general Formula II and in which the radical A contains nitrogen atoms and reactive hydrogen atoms, e.g. trimeric 2-methyl-aziridine of the formula

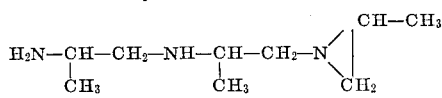

tetrameric aziridine of the formula

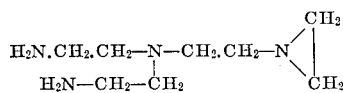

trimeric 2,2-dimethyl-aziridine of the formula

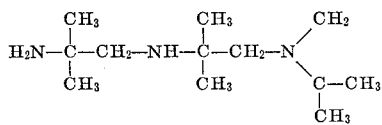

1-[3-(3-aminopropylamino)-propyl]-aziridine may also be used.

According to the invention, one may also use compounds which have two aziridine rings and a reactive hydrogen atom, e.g. bis[3-(1-aziridinyl)-propyl]-amine and aziridine compounds containing hydroxyl groups, e.g. those of the general Formula III

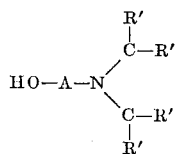

in which R' and A have the meaning already indicated for the general Formula I, e.g.

1-aziridinomethanol,
1-(2-hydroxyethyl)-aziridine,
1-(3-hydroxypropyl)-aziridine,
1,2-bis-(1-aziridinyl)-1,2-dihydroxy-ethane,
1,2-bis-[1-(2-methylaziridinyl)]-1,2-dihydroxy-ethane,
1,2-bis-[1-(2-ethylaziridinyl)]-1,2-dihydroxy-ethane.

Addition products of 1,2-alkylene oxides such as ethylene oxide, 1,2-propylene oxide, 1-2- or 2,3-butylene oxide, styrene oxide of epichlorohydrin with aziridines of the above mentioned general Formula II may also be mentioned. 1-(2-hydroxyethyl)-aziridines are formed in cases where 1 mol of 1,2-alkylene oxide is added while monofunctional aziridinyl-polyalkylene ethers are formed in cases where several mols are added, as well as aziridine compounds that the obtained by addition of 1,2-alkylene oxides to the above mentioned aziridine compounds which contain primary or secondary amino groups.

Adducts obtained by addition of aziridines of the general Formula II to hydroxyalkyl esters of $\alpha,\beta$-unsaturated carboxylic acids, e.g. acrylic acid, methacrylic acid or crotonic acid, which aducts have one aziridine radical and one hydroxyl group in the molecule, e.g. 3-(1-aziridinyl)-propionic acid 2-hydroxethyl ester may also be used in accordance with the invention.

3-(1-aziridinyl)-propionate, 3-(1-aziridinyl)-2-methyl-propionamide and 2-(1-aziridinyl)-acetamide are further examples of aziridine compounds that have one aziridine ring and reactive hydrogen atoms.

According to the invention, it is, of course, also suitable to use aziridine compounds that do not have any hydrogen atoms that are reactive with isocyanate but have at least two aziridine rings, the nitrogen atoms of these aziridine rings being linked to methylene groups which may be alkylated or arylated. Compounds of this type are easily obtainable as described in German patent specification 836,353 by addition of aziridines of the general Formula II to $\alpha,\beta$-unsaturated carboxylic acid esters of polyhydric alcohols. The $\alpha,\beta$-unsaturated carboxylic acid esters are in turn obtainable by esterification of polyols with $\alpha,\beta$-unsaturated carboxylic acids such as acrylic acid, methacrylic acid, crotonic acid, tiglic acid, sorbic acid and cinnamic acid. Suitable glycols are those of the general formula HO—$(CH_2)_n$—OH ($n$ is an integer of 2–10), such as 1,3- and 2,3-butylene glycol, 1,2-propylene glycol, glycerol, trimethylolpropane and pentaerythritol. One example of this group of compounds is bis-[3-(1-aziridinyl)-propionic acid]-ethylene glycol ester. Higher molecular weight, linear or branched polyalkylene ethers such as are obtainable by polyaddition of 1,2-alkylene oxides to bi- or polyfunctional polyols of the above mentioned type by known processes are suitable, after reaction with $\alpha,\beta$-unsaturated carboxylic acids or their derivatives, for the preparation of polyaziridines. One may also use polyaziridines which have been obtained by addition of aziridines of the general Formula II to polyesters of $\alpha,\beta$-unsaturated dicarboxylic acids and polyhydric alcohols. Polyaziridines obtained by adition of aziridines of the general Formula II to polymers obtained according to U.S. patent specification 2,556,075 by epoxide polymerization of compounds of the general formula

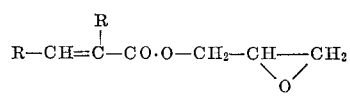

(R=hydrogen or a methyl group) may also be used according to the invention as may also tris-aziridine compounds obtained by addition of aziridines of the general Formula II to the condensation product of the formula

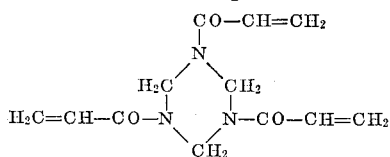

obtained from 3 mols of acrylonitrile and 3 mols of formaldehyde, and finally the polyaziridine compounds obtained acording to British patent specification 1,044,753.

The following are illustrative examples of organic compounds with reactive hydrogen atoms according to the Zerewitinoff method that may be used for synthesizing the foam plastics which can be produced according to the invention; linear or branched higher molecular weight polyhydroxyl compounds such as the hydroxyl-containing polyesters which are obtained by known processes from polycarboxylic acids and/or hydroxycarboxylic acids and di- and/or higher functional polyols. Polyesters which have as low as possible viscosity and are liquid at room temperature are especially advantageous. Suitable polycarboxylic acids include adipic acid, sabecic acid, maleic acid, 2-hydroxy adipic acid and the like. Suitable polyols include 1,4-butane diol, ethylene glycol, hexane diol, trimethylolpropane, pentaerythritol and the like. For the same reason, higher molecular weight polyols that are especially suitable are the linear or branched polyalkylene ether polyols, in most cases of low viscosity, which are readily obtainable by polyaddition reactions of 1,2-alkylene oxides such as ethylene oxide, 1,2 - propylene oxide, 1,2- and 2,3- butylene oxide, epichlorohydrin or styrene oxide with low molecular weight starter molecules such as water, trimethylolpropane, pentaerythritol, amino alcohols, hydrazines or polyamines. Also suitable according to the invention are higher molecular weight, hydroxyl-containing polythioethers, polyacetals, polyester amides or polycarbonates or mixtures thereof which may contain urethane groups. The hydroxyl numbers of these higher molecular weight polyols should preferably be in the region of between 5 and 250. Compounds with reactive hydrogen atoms that are suitable according to the invention also include higher molecular weight compounds which have amino, carboxyl or mercapto groups, e.g. carboxyl-containing polyesters or amino- or mercapto-containing polyurethanes.

The following organic polyisocyanates may be used according to the invention: aliphatic polyisocyanates such as 1,4 - diisocyanatobutane, 1,6 - diisocyanatohexane, m- and p-xylylene diisocyanate, dicyclohexylmethane-4,4'-diisocyanate, cyclohexane - 1,3- and cyclohexane-1,4-diisocyanate, 1-methyl - cyclohexane - 2,4- and 2,6-diisocyanate, aromatic polyisocyanates such as 1-alkylbenzene-2,4- and 2,6 - diisocyanates, e.g. toluylene-2,4- and toluylene-2,6-diisocyanate and any isomeric mixtures of these two isocyanates, phenylene-1,3- and phenylene-1,4-diisocyanate, diphenylmethane-4,4'-diisocyanate, naphthylene-1,5-diisocyanate, diphenylether-4,4' - diisocyanate, 2,2'-dimethyldiphenylmethane-4,4' - diisocyanate, polymethylene polyphenyl polyisocyanates prepared by analine formaldehyde condensation followed by phosgenation, toluene-2,4,6-triisocyanate, 4,4',4''-triphenylmethane triisocyanate, 1 - methyl - 3,5,6-chlorobenzene-2,4-diisocyanate and di-isocyanate-mono-, di- and trichlorotoluenes obtained by chlorination in the side chain. The said polyisocyanates may be used either singly or in mixtures with other polyisocyanates. Dimeric mono- and polyisocyanates may also be used, e.g., 3,3' - diisocyanate - 4,4' - dimethyl-diphenyluretidone. Polyisocyanates which can be prepared according to German patent specification 1,092,007 may also be used according to the invention. In carrying out the process according to the invention it is preferred to use diisocyanates.

The process according to the invention may be carried out in various ways. One of these consists in reacting all the reactants together simultaneously, i.e. aziridine compounds, compounds with reactive hydrogen atoms, polyisocyanates and water and foaming the reactants. If the aziridine compound has been prepared from compounds with reactive hydrogen atoms, e.g. by esterification of a $\alpha,\beta$-unsaturated carboxylic acid ester with a higher molecular weight polyhydroxyl compound and addition of aziridine to this unsaturated ester, it may sometimes be possible to dispense with the use of other compounds with reactive hydrogen atoms during the foaming process. As a rule, however, this is not the case. The reaction between isocyanate and water which yields carbon dioxide as the blowing agent is catalyzed by the polyaziridine compounds which are basic in reaction, and simultaneously with this exothermic reaction the aziridine rings are opened and the polyaziridine compound is incorporated into the polyurea structure formed from isocyanate and water, so that a foam structure is formed with progressive solidification of the reaction mixture. The weight per unit volume can be influenced in a desired manner as in the known conventional processes by altering the quantity of water used, and the other properties of the foam plastic can be influenced by the choice of the type of polyaziridine compound. By adjusting the quantity and constitution of the compounds which contain at least one aziridine ring, the foaming process can be influenced in a desired direction, e.g. as regards shorter setting times, and at the same time the properties of the foam can be influenced within wide limits.

Instead of monomeric polyisocyanates which are reacted and foamed simultaneously with all the reactants, higher molecular weight polyisocyanates may be used which cay be prepared by reacting the compounds with reactive hydrogen atoms already mentioned above with excess polyisocyanates. These higher molecular weight polyisocyanates may be reacted and foamed simultaneously with all other reactants. On the other hand, these higher molecular weight polyisocyanates may be reacted successively with the other reactants, and foaming may be carried out in the last stage by adding water.

Another embodiment of the process according to the invention consists in starting from the higher molecular weight polyisocyanates already mentioned above, i.e. the isocyanate containing preadducts which can be obtained by reacting the said compounds carrying reactive hydrogen atoms with excess polyisocyanates, and then reacting these prepolymers at room temperature or elevated temperature with aziridines which contain reactive hydrogen atoms, e.g., aziridines of the general Formula I or III, to form polyaziridine compounds.

The polyaziridine compounds prepared in this way can be foamed with polyisocyanates and water either immediately or later. If conversion of the polyaziridine compounds into foams is to be carried out later, it is advantageous to use equivalent quantities of aziridine compound containing reactive hydrogen and prepolymers, the quantities being based on the NCO content of the preadducts. On the other hand, one may use smaller quantities of aziridine compound containing reactive hydrogen, and this may be advantageous especially if the resulting prepolymers are to be worked up immediately and if the prepolymers have high NCO contents. In the last mentioned case, if aziridines which contain amino groups are used, e.g. those of Formula I, such as 1-(3-aminopropyl)-aziridine, the interval of time between the addition of aziridine to NCO containing prepolymer and the addition of more isocyanate and water to initiate the foaming process can be very short owing to the high velocity with which amines and isocyanates react, and may be only a few seconds. This means, for example, that if known mechanical foaming apparatus is used, an NCO containing prepolymer is introduced into the top of a mixing chamber where it is reacted with aminoaziridine, and in the lower part of the mixing chamber it is mixed with further isocyanate and water, so that a mixture capable of being foamed leaves the mixing head of the machine in a continuous stream.

The blowing reaction which liberates carbon dioxide is effected by reacting the polyisocyanates already mentioned above, preferably diisocyanates, with water. Monofunctional isocyanates, e.g. phenylisocyanate, cyclohexylisocyanate or naphthylisocyanates may also be added or used exclusively for the carbon dioxide generating reaction.

The higher molecular weight polyaziridines obtainable from NCO containing prepolymers and aziridine compounds which contain reactive hydrogen atoms in some cases have relatively high viscosities so that difficulties may arise in mechanical foaming. In such cases, it is advantageous to effect foaming at elevated temperatures or to add diluents which lower the viscosity. Thus, according to another method of carrying out the process according to the invention, an NCO containing prepolymer is reacted with a mixture of the compound which contains at least one aziridine ring and a further quantity of a compound which contains reactive hydrogen atoms, this compound serving as diluent, and the mixture is foamed with water and more polyisocyanate, either immediately or later. Suitable compounds with reactive hydrogen atoms include, for example, the higher molecular weight compounds with reactive hydrogen atoms already mentioned above. However, at least a certain proportion may consist of low molecular weight compounds with reactive hydrogen atoms. Preferred diluents, however, are linear or branched polyalkylene ethers, obtainable for instance from 1,2-alkylene oxides, especially polypropylene glycol ethers obtainable from 1,2-propylene oxide, or polybutylene glycol ethers obtainable from 1,2- and/or 2,3-butylene oxide, these compounds being distinguished by their low viscosities.

The presence of aziridine compounds of the type characterized during foaming with polyisocyanate and water is an object of the present invention. Incorporation of the aziridine compounds into the foam structure invariably takes place so that these aziridine compounds are to be regarded as essential structural elements. Aziridine compounds to be used according to the invention are polyfunctional, special importance being attached to the aziridine ring as a reactive molecular grouping. In the same way as the simple aziridines which are unsubstituted on the nitrogen atom, the aziridines used which are substituted on the nitrogen atom are subjected to a ring opening reaction reaction initiated by heat or catalysts to form a reactive intermediate stage which is capable of polymerization reactions with itself or with a very wide variety of addition reactions with other compounds containing reactive hydrogen atoms (see Houben Weyl, 4th Edition, vol. XI/2, page 247).

According to the invention, foaming of the components may also be carried out in the presence of compounds which catalytically accelerate opening of the aziridine ring. Particularly suitable for this are inorganic and organic acids, including Lewis acids, compounds which liberate acids, inorganic or organic acid chlorides, benzyl halides, carbamic acid chlorides, acid anhydrides, alkylating agents such as, in particular, aryl sulphonic acid alkyl esters, alkyl sulphonic acid alkyl esters, sulphonic acid anhydrides, aromatic and aliphatic sulphinic acid esters, metal alkyl sulphates, dialkylsulphites, dialkylsulphates, sultones, and the compounds mentioned in German patent specifications 888,170 and 914,325. Thus, according to a special embodiment of the invention, foaming is carried out in the presence of quaternizing agents, of which alkanesultones and/or aryl sulphonic acid alkyl esters are especially suitable. The following may be mentioned as specific examples: hydrogen chloride, hydrogen bromide, hydrogen iodide, carbon dioxide, mono-, di- and trichloroacetic acid or esters thereof, bromoacetic acid and its esters, phosphoroxy chloride, benzoyl chloride, benzyl bromide, hexahydrophthalic acid anhydride, methylbenzenesulphonate, methyl p-toluene sulphonate, ethyl p-chlorosulphonate, methyl o-toluenesulphonate, the methyl, ethyl and butyl esters of methane sulphonic acid, sodium methyl sulphate, dimethylsulphite, dimethylsulphate, diethylsulphate and dibutylsulphate, propanesultone and butanesultone. To achieve the desired effect, it is generally sufficient to use catalytic quantities of the order of 0.1 to 0.01 per thousand of the said compounds. On the other hand, higher doses e.g. up to 0.1% and even 10% are also used, for example when propane sultone is used or in the case of arylsulphonic acid alkyl esters with two or more C-atoms in the alkyl radicals, which esters have a relatively weak alkylating effect.

The cellular polyurethane plastics of the invention are useful particularly for the preparation of cushions, insulation for the walls of dwellings, automotive parts including crash pads, arm rests and the like.

The invention is further illustrated by the following examples in which parts are by weight unless otherwise specified.

EXAMPLE 1

(a) About 100 parts of an NCO containing prepolymer (NCO content 3.5%, viscosity 4000 cp./25° C.) of a linear polypropylene glycol ether (OH number=56) and 2,4-diisocyanato-toluene (NCO/OH ratio=2) are stirred together with about 8 parts of a 1-(3-aminopropyl)-aziridine and about 3 parts of water. About 28 parts of 1,6-diisocyanatohexane and about 8 parts of a mixture of 70% propane and 30% delta-butanesultone are added at brief intervals to the reaction mixture, the temperature of which is rising. The mixture of components immediately starts to foam, and after about 60 seconds it forms an elastic, light-fast foam plastic which is completely dry on the surface.

If the quantity of 1-(3-aminopropyl)-aziridine is lowered from about 8 parts to about 6.0 and about 4.0 parts per 100 parts of NCO prepolymer, foam plastics are again obtained by the analogous reaction. The physical properties are indicated in the following table.

| 1-(3-amnenopropyl)-aziridine | Weight per unit volume kg.m.$^3$ | Tensile strength, kp./cm.$^2$ | Elongation at break, percent | Resistance/to compression 40% p./cm.$^3$ |
|---|---|---|---|---|
| 8.0 | 43 | 0.7 | 80 | 52 |
| 6.0 | 39 | 0.6 | 95 | 35 |
| 4.0 | 40 | 0.5 | 130 | 24 |

The foam plastics listed are non-combustible according to the ASTM test D 1692.

(b) About 100 parts of the NCO prepolymer mentioned above are intimately mixed by stirring with about 5.5 parts of 1-(3-aminopropyl)-aziridine and about 3 parts of water. To this are then added about 30 parts of an isomeric mixture of 65% 2,4- and 35% 2,6-diisocyanatetoluene in which about 4 parts of propane sultone serving as quaternizing agent are dissolved. After a short time during which the reaction mixture rises, a foam plastic is obtained which is non-sticky on the surface and has the following physical properties.

Weight per unit volume—33 kg./m.$^3$
Tensile strength—0.8 kp./cm.$^2$
Elongation at break—90%
Resistance to compression (40%)—36–37 p./cm.$^3$ (c) If the propane sultone indicated in Example 1(b) is replaced by about 0.03 part of benzoyl chloride as quaternizing agent, a foam plastic with the following properties is obtained:

Weight per unit volume—35 kg./m.$^3$
Tensile strength—0.9 kp./cm.$^2$
Elongation at break—125%
Resistance to compression (40%)—17 p./cm.$^3$

EXAMPLE 2

(a) About 100 parts of the NCO containing prepolymer mentioned in Example 1(a) (NCO content 3.5%) and about 0.1 part of tin-ethylhexoate are stirred together with about 7.4 parts of 1-(2-hydroxyethyl)-aziridine, and after about 15 to 20 seconds about 3 parts of water followed by about 30 parts of an isomeric mixture of 80% 2,4- and 20% 2,6-diisocyanatotoluene and about 3 parts of toluene sulphonic acid methyl ester are added to the mixture.

After a short setting and expanding time, a foam plastic with high compression resistance is obtained. The foam plastic is self-extinguishing and in the ASTM D-1692 test shows a combustible portion of about 25 to 30 mm.

Foam plastics with similar physical properties are obtained by replacing 1-(2-hydroxyethyl)-aziridine with about 8.2 parts of 1-(2-hydroxy-2-methylethyl)-aziridine.

EXAMPLE 3

About 100 parts of an NCO containing prepolymer (NCO content 2.5%, viscosity 3000 cp./25° C.) derived from a linear polypropylene glycol ether (OH number 35.6) and 2,4-diisocyanato-toluene (NCO/OH ratio=2) are stirred together with about 6 parts of bis-[3-(aziridinyl)-propyl]-amine and about 3 parts of water.

After about 3 seconds, a solution of about 28 parts of 1,6-diisocyanatohexane and 4 parts of butanesultone are added to the reaction mixture which is becoming hot due to generation of heat. After a short time during which the reaction mixture rises, a semi-hard, elastic foam plastic is obtained.

EXAMPLE 4

About 1000 parts of a linear polypropylene glycol ether with OH number 35.6 together with about 83 parts of 2,4-diisocyanatotoluene (NCO/OH ratio=1.5) are heated under nitrogen for about 10 hours at about 100° C. The NCO containing prepolymer obtained at the end of this time has an NCO content of about 1.2% and a viscosity of about 4500 cp./25° C. About 100 parts of the NCO containing prepolymer are first reacted with about 2.5 parts of 1-(3-aminopropyl)-aziridine and about 3 parts of water, and after about 2 to 3 seconds with a solution of about 30 parts of an isomeric mixture of 80% 2,4- and 20% 2,6-diisocyanato-toluene and about 4 parts of benzene sulphonic acid methyl ester.

After an expansion time of about 80 seconds, a very soft, highly elastic foam plastic is formed.

EXAMPLE 5

If about 1000 parts of the NCO containing prepolymer (NCO content 2.5%) mentioned in Example 3 are mixed with about 1 part of tin-ethyl hexoate and 60 parts of 1-(2-hydroxy-2-methylethyl)-aziridine, an aziridine compound having a viscosity of about 20,000 cp./25° C. is formed with evolution of heat. About 100 parts of this compound are heated to about 40 to 50° C., stirred together with about 3 parts of water and then reacted with about 28 parts of 1,6-diisocyanatohexane and about 5 parts of a mixture of 85% propanesultone and about 15 parts of butanesultone. After a setting time of about 70 seconds, an elastic foam plastic is obtained which according to ASTM D-1692 is to be regarded as incombustible.

EXAMPLE 6

The aziridinyl-polypropylene glycol ether of OH number 54 obtained by the addition reaction of propylene oxide to 1-(3-aminopropyl)-aziridine has a viscosity of about 1750 cp./25° C. If about 100 parts of this aziridinyl polypropylene glycol ether are stirred together with only about 0.4 part of an organosiloxane-alkylene oxide block polymer, about 0.4 part of tin-ethyl hexoate and about 3 parts of water, the reaction mixture starts to foam when a solution of about 38.5 parts of an isomeric mixture of 65% 2,4- and 35% of 2,6-diisocyanatotoluene and about 4 parts of propane sultone is added. An elastic foam plastic is obtained after a short expansion time.

EXAMPLE 7

About 100 parts of a mixture of about 80 parts of a branched polypropylene glycol ether (OH number 56) and about 20 parts of a reaction product of the NCO containing prepolymer mentioned in Example 2 with 1-(3-aminopropyl)-aziridine (viscosity 1500 cp./25° C.), about 0.2 part of tin ethyl hexoate and only about 0.1 part of an organosiloxane-alkylene oxide block polymer are mixed with about 3 parts of water. A solution of about 38 parts of 2,4-diisocyanatotoluene and about 2 parts of a mixture of 70% propane sultone and about 30% delta-butane sultone is then added. The resulting foam plastic is self extinguishing and according to the ASTM test D-1962 it shows a combustible portion of 50 to 60 mm.

EXAMPLE 8

About 100 parts of an NCO containing prepolymer (NCO content 3.6%) obtained from a branched polyether (OH number 56) based on propylene oxide, trimethylolpropane, and 1,2-propylene glycol and 2,4-diisocyanatotoluene (NCO/OH ratio=2) are intimately mixed by stirring with about 5 parts of 1-(3-aminopropyl)-2-methyl aziridine or with about 5 parts of 1-(3-aminopropyl)-aziridine and about 2 parts of water. After about 20 parts of an isomeric mixture of 80% of 2,4- and 20% of 2,6-diisocyanatotoluene and about 3 parts of benzyl chloride have been incorporated, a soft foam plastic of high elasticity is obtained. According to ASTM D-1962 the foam plastic is self-extinguishing and has a combustible portion of about 25 to 30 mm.

EXAMPLE 9

A polythioether (OH number 72, viscosity 1800 cp./25° C.) prepared from thiodiglycol and hexanediol is converted with 2,4 - diisodyanatotoluene (NCO/OH ratio=2) into an NCO containing prepolymer which has an NCO content of about 4.2% and a viscosity of about 9000 cp./25° C. About 100 parts of this NCO prepolymer are stirred together with about 8 parts of 1-(2-aminoethyl)-aziridine and about 2 parts of water. After a few seconds, a mixture of about 38 parts of propyl isocyanate and about 4 parts of delta-butanesultone are added. The foam plastic formed after a short expansion time is elastic.

EXAMPLE 10

About 100 parts of an NCO containing prepolymer (NCO content about 6.2%) obtained from a linear polypropylene glycol ether (OH number 112) and 2,4-diisocyanatotoluene (NCO/OH ratio=2) are mixed with about 10 parts of 1-(3-aminopropyl)-aziridine and about 1 part of water. On the addition of about 9 parts of 1,6-diisocyanatohexane and about 5 parts of a mixture of 25% propanesultone and 75% delta-butanesultone, a semirigid foam plastic which is incombustible according to ASTM D-1692 is obtained after an expansion time of about 10 to 20 seconds.

EXAMPLE 11

About 100 parts of an NCO containing prepolymer (NCO content 2.8%) from a linear polyester based on adipic acid and diethylene glycol (OH number 40) and 2,4-diisocyanatotoluene (NCO/OH ratio=2) are mixed with about 400 parts of a slightly branched polyester (OH number 60) and immediately stirred together with about 6.2 parts of 1-(3-aminopropyl)-aziridine.

About 100 parts of this solution are mixed with about 1.3 parts of sulphonated castor oil (sodium salt, water content=50%), about 1.3 parts of hydroxyethylated oxydiphenyl which is benzylated, and about 2.5 parts of water, and then reacted with about 43 parts of an isomeric mixture of 65% of 2,4- and 35% of 2,6-diisocyanatotoluene and about 4 parts of a mixture of 70% propane sultone and 30% delta-butane sultone. An elastic foam plastic forms after rapid expansion and setting.

EXAMPLE 12

(a) About 3 parts of water and about 4 parts of the ethyl ester of bis-β-ethyleneiminobutyric acid are added to about 100 parts of a branched polypropylene glycol ether (OH number 40), about 0.3 part of tin-ethyl hexoate and only about 0.3 part of an organosiloxanealkylene oxide block polymer. A solution of about 4 parts of propane sultone in about 37 parts of an isomeric mixture of 80% of 2,4- and 20% of 2,6-diisocyanatotoluene is then added and the mixture intimately mixed with stirring. The elastic foam which forms is self-extinguishng and shows, accordng to ASTM D-1692, a combustible portion of about 50 to 60 mm.

(b) If the ethyl ester of bis-β-ethyleneimino-butyric acid is replaced by about 2 parts of an addition product of 3 mols of ethylene imine and 1 mol of triacrylohexahydro-triazine-(1,3,5), a self-extinguishing foam plastic having a combustible portion of about 50 to 60 mm. is obtained under the same conditions.

EXAMPLE 13

About 5 parts of the compound prepared by the addition of 2 mols of propylene oxide to 1-(3-aminopropyl)-aziridine in the presence of about 3 parts of water are stirred together with about 100 parts of a branched polypropylene glycol ether (OH number 40), about 0.5 part of an organosiloxane-alkylene oxide block polymer and about 0.3 part of tin-ethyl hexoate. About 42 parts of an isomeric mixture of 80% of 2,4- and 20% of 2,6-diisocyanato-toluene and about 4 parts of ethyltoluenesulphonate are then added. The resulting foam plastic has slightly closed pores.

EXAMPLE 14

About 92 parts of a branched polyether (OH number=56) containing 40% of ethylene oxide and 60% of propylene oxide are stirred together with about 8 parts of a branched polyether (OH number 42), about 0.15 part of diazabicyclooctane and then with about 2 parts of 1-(3-aminopropyl)-aziridine and about 3 parts of water. After the addition of a mixture of about 59 parts of an organic polyisocyanate prepared according to Example 1 of German patent specification 1,092,007 and about 2 parts of propanesultone, the reaction mixture starts to expand in about 12 seconds, and a foam plastic which is no longer sticky on the surface is obtained shortly after completion of the expansion time (about 50 seconds). The foam plastic has good physical properties and is self extinguishing. The combustible portion is about 30 to 35 mm. according to ASTM D-1692.

EXAMPLE 15

About 100 parts of the NCO containing prepolymer indicated in Example 1 are mixed with about 5.5 parts of 1-(3-aminopropyl)-aziridine and about 3 parts of water. After a short interval about 30 parts of an isomeric mixture of 65% of 2,4- and 35% of 2,6-diisocyanatotoluene are incorporated. The reaction mixture soon begins to foam, and a self-extinguishing foam plastic which has a combustible portion of about 50 mm. and the following physical properties:

Weight per unit volume—34 kg./m.³
Tensile strength—0.8 kp./cm.²
Elongation at break—120%
Compression resistance (40%)—19 p./cm.³ is obtained after about 50 seconds.

EXAMPLE 16

About 500 parts of an unsaturated polyester (OH number 28, acid number 20) prepared from maleic acid anhydride, adipic acid and 1,3-butanediol are mixed with about 50 parts of triethylamine and about 150 parts of ethylene imine. When the exothermic reaction has died down, the mixture is kept for a further 4 hours at about 70° C. Excess triethylamine and ethylene imine are then removed under vacuum.

About 100 parts of the reaction product described are intimately mixed with about 2 parts of water. On the addition of about 19 parts of 1,6-diisocyanatohexane and about 5 parts of a mixture of 70% propane sultone and 30% delta-butanesultone, the mixture starts to foam and a semirigid foam plastic is obtained after about 30 seconds.

In the foregoing examples it is understood that tin ethyl hexoate may also be named stannous octoate and that where the term "organosiloxane alkylene oxide block polymer" is used the following compound is employed:

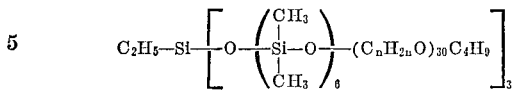

wherein ($C_nH_{2n}O$) is a mixed polyoxyethylene and oxypropylene block copolymer containing about 17 oxyethylene units and about 13 oxypropylene units.

It is also to be understood that the foregoing working examples are given for the purpose of illustration and that any other suitable organic polyisocyanate, organic compound containing active hydrogen containing groups, aziridine compound, catalyst, stabilizer or the like can be substituted therein provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. In a process for the production of foam plastics based on organic compounds containing reactive hydrogen atoms as determined by the Zerewitinoff method, organic polyisocyanates and water, the improvement which comprises conducting the foaming with polyisocyanates and water in the presence of at least about 2.8 percent by weight based on the weight of reactive hydrogen containing compound of a compound which contains at least one aziridine ring in which the nitrogen atom of the aziridine ring is attached to a methylene group and which compound also contains at least one hydrogen atom that is reactive with isocyanates.

2. The product of the process of claim 1.

3. Process according to claim 1, characterized in that foaming is carried out in the presence of a compound of the formula:

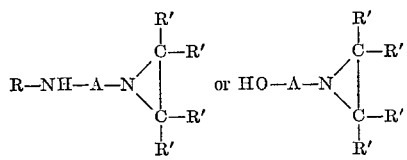

in which

or a bifunctional organic radical linked to the nitrogen atom of the aziridine ring via

R is hydrogen, alkyl, cycloalkyl or aryl, and R' is hydrogen or an alkyl, hydroxyalkyl or aryl radical.

4. Process according to claim 1 characterized in that foaming is carried out in the presence of a quaternizing agent.

5. Process according to claim 1 characterized in that foaming is carried out in the presence of an alkanesultone or arylsulphonic acid alkyl ester as quaternizing agent.

6. Process according to claim 1 characterized in that the reaction products of a compound with reactive hydrogen atoms and an excess of organic polyisocyanate is reacted with the compound which contains at least one aziridine ring, and is foamed either immediately or subsequently with water and more polyisocyanate.

7. Process according to claim 6 characterized in that the reaction product of a compound containing reactive hydrogen atoms and an excess of an organic polyisocyanate is reacted with a mixture of the compound which has at least one aziridine ring and a further quantity of a compound which has reactive hydrogen atoms, and it is immediately or subsequently foamed with water and more organic polyisocyanate.

8. Process according to claim 1 characterized in that all the reactants are reacted and foamed together simultaneously.

References Cited

UNITED STATES PATENTS

| | | | |
|---|---|---|---|
| 3,054,757 | 9/1962 | Britain | 260—2.5 |
| 3,073,787 | 1/1963 | Krakler | 260—2.5 |
| 3,146,219 | 8/1964 | Beitchman | 260—75 |
| 3,154,522 | 10/1964 | Beitchman | 260—77.5 |
| 3,179,628 | 4/1965 | Beitchman | 260—77.5 |
| 3,232,908 | 2/1966 | Oertel et al. | 260—75 |
| 3,260,702 | 7/1966 | Murakami et al. | 260—77.5 |
| 3,395,129 | 7/1968 | Dieterich et al. | 260—77.5 |
| 3,419,533 | 12/1968 | Dieterich | 260—77.5 |
| 3,450,676 | 6/1969 | Grogler et al. | 260—77.5 |
| 3,453,242 | 7/1969 | Schmitt et al. | 260—77.5 |

HOSEA E. TAYLOR, Primary Examiner

C. W. IVY, Assistant Examiner